April 26, 1960 C. J. D'AMICO 2,934,689
SERVO SYSTEMS AND QUADRATURE SIGNAL FILTER THEREFOR
Filed Nov. 22, 1957 2 Sheets-Sheet 1
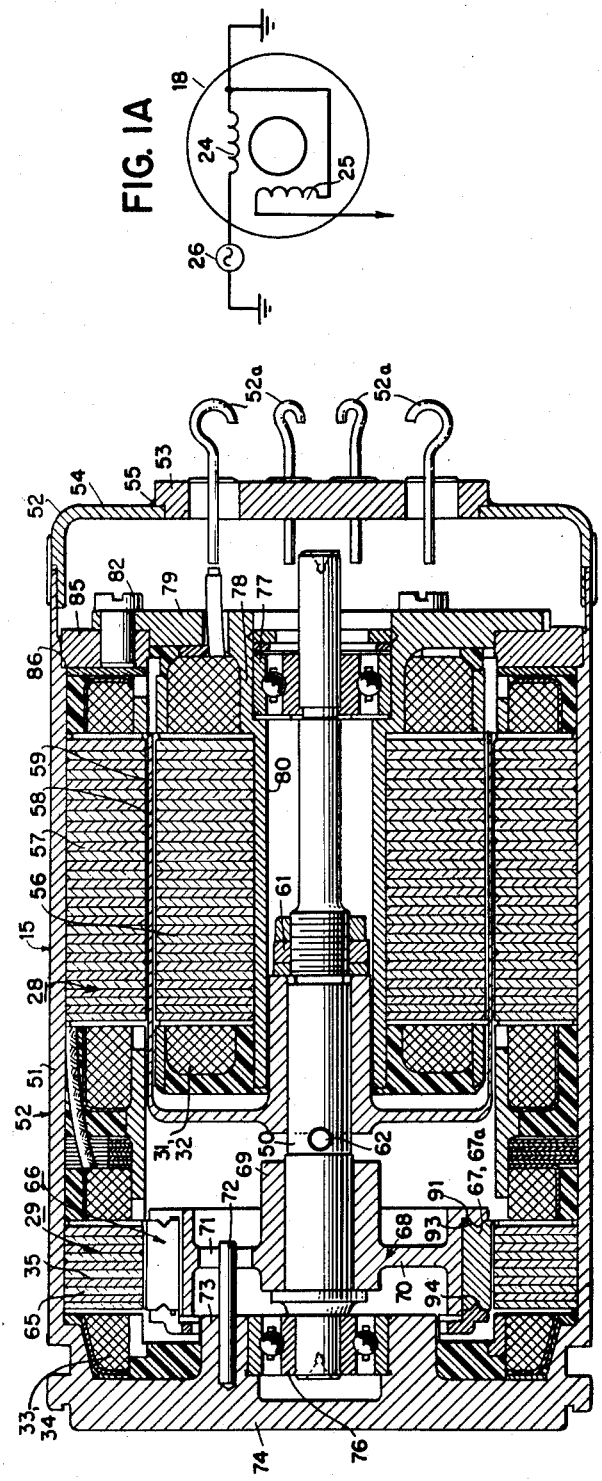
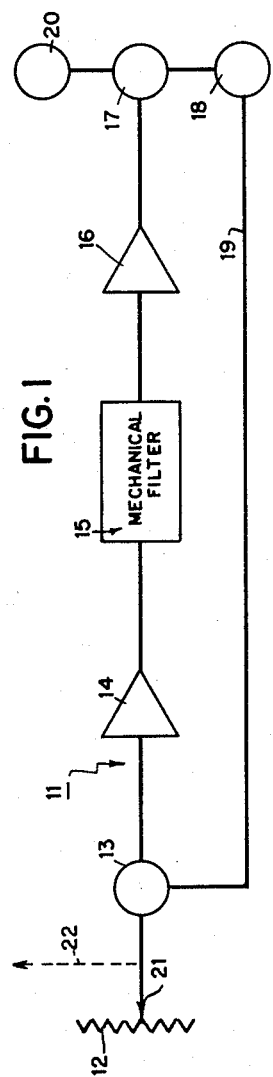
INVENTOR.
Carmine J. D'Amico April 26, 1960
C. J. D'AMICO
2,934,689
SERVO SYSTEMS AND QUADRATURE SIGNAL FILTER THEREFOR
Filed Nov. 22, 1957
2 Sheets-Sheet 2
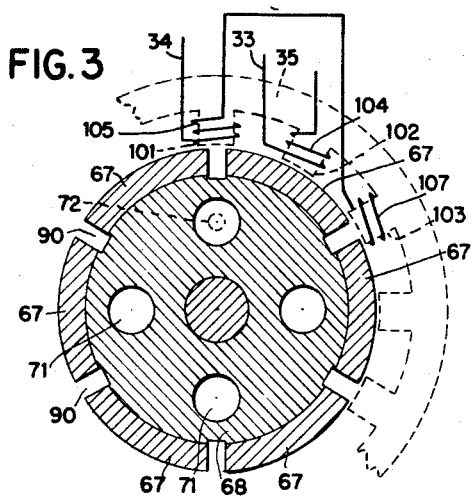
FIG. 3
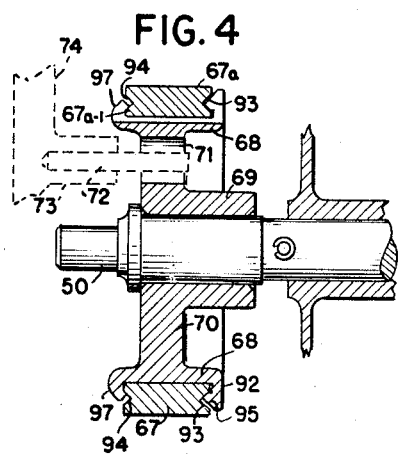
FIG. 4
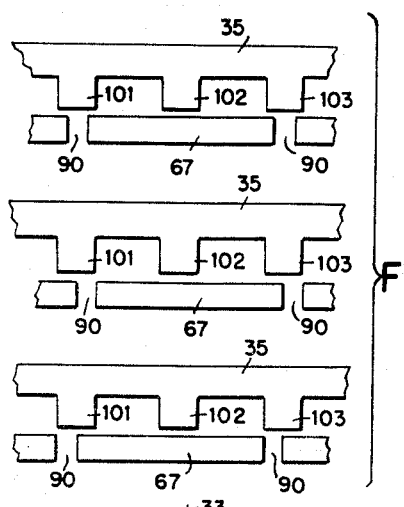
FIG. 7
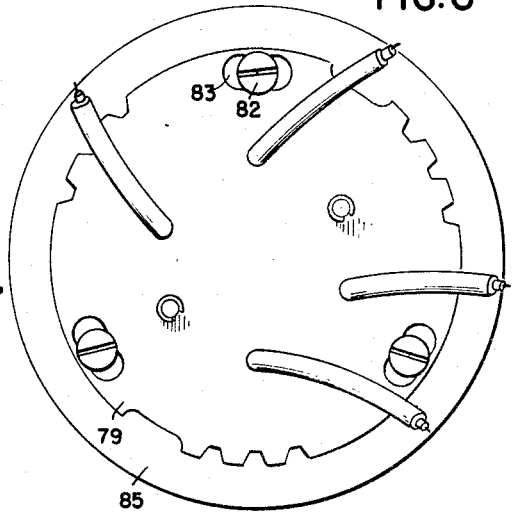
FIG. 6
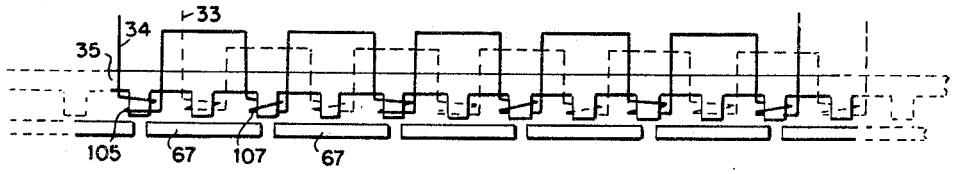
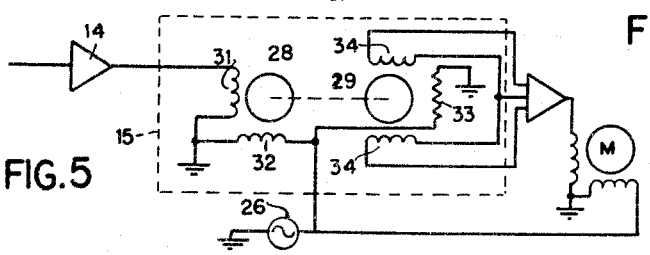
FIG. 8
FIG. 5
INVENTOR.
Carmine J. D'Amico
BY United States Patent Office 2,934,689
Patented Apr. 26, 1960

2,934,689

SERVO SYSTEMS AND QUADRATURE SIGNAL FILTER THEREFOR

Carmine J. D'Amico, Paterson, N.J., assignor to General Precision, Inc., a corporation of Delaware Application November 22, 1957, Serial No. 698,124

19 Claims. (Cl. 318—328)

This invention relates to servo systems and to an electromechanical signal filter particularly useful in servo systems.

A servo system may be considered, in brief, as comprising a signal-receiving and comparing unit, an amplifier, a servo motor to be controlled by energy from the amplifier for operating a desired controllable load, and some means, for example, a generator operable by the servo motor, to provide a signal indication of a condition or position of the servo motor or of the load.

Such signal indication from the motor or load is fed back to the signal-receiving and comparing unit and is there compared with the incoming signal. Any difference between the incoming signal and the feed-back signal constitutes and provides an error signal which represents the deviation or momentary departure of the load from its proper or desired condition or position corresponding to the input signal. Such error signal then becomes the control signal to the amplifier, to energize the servo motor to control the load to establish the condition or position desired, as represented by the incoming signal.

Where the system is an alternating current system, such an incoming signal may come from a dynamo-electric or induction signal generator and will usually have a substantial content of harmonics. Such signal may also have a substantial quadrature component. The harmonics and the quadrature both accompany the signal and accomplish nothing beneficial in the operation of the servo system. What is worse, those signal components use up considerable capacity of the servo system and render the system less sensitive, less accurate and more sluggish in operation, since the system responds to the entire apparent signal content.

If, therefore, the harmonic and quadrature components of an incoming signal could be removed from the control functions of a servo system, greater sensitivity, accuracy and speed could be achieved, in response to the true signal content, all of which are highly desirable.

In order to provide the feed-back signal to show the condition or position of the load, or of the servo motor, which may indicate the same thing, many such servo systems utilize a dynamo-electric generator to generate the feed-back signal. One type of generator preferably employed is the tachometer generator, because of the substantially linear relation between its speed and its output signal voltage.

One of the inherent faults of the tachometer generator is that the signal voltage which it generates also contains a spurious quadrature voltage component that constitutes its base line or null voltage. Thus, the feed-back signal from the tach generator may also introduce a quadrature component into the error signal.

While such quadrature component in the feed-back signal may be small, such feed-back component becomes amplified in passage through the amplifier. Since the amplifier is usually multi-stage, the amplified quadrature component that traverses the final amplifier stage becomes quite substantial as a null voltage base or component.

Such spurious quadrature null voltage is undesirable because it constitutes an inaccuracy in the voltage. Moreover, it imposes a load burden upon each of the elements in the circuit which the tachometer signal voltage must traverse. In the case of a servo system where an amplifier must be employed to step up the amplitude of the input signal to a power value sufficient to operate a servo motor, the undesirable quadrature component of the feed-back voltage of the tachometer generator traverses and loads the amplifier sufficiently to cause the amplifier to saturate and operate at a point beyond its normal sensitive range. As a result, the sensitivity and response of the amplifier are less than its proper and presumed value, so that the effectiveness of the amplifier is lost, and the sensitive and high speed control of the servo motor is detrimentally affected.

One object of this invention is to provide an electromechanical filter by means of which the spurious or unwanted quadrature voltage component in the feed-back signal voltage from the tachometer generator is eliminated, so the amplifier will not be unnecessarily loaded by a signal voltage component that serves no function in the operation of the system.

Another object of the invention is to provide a servo system of the closed-loop type, wherein the effects of such spurious quadrature voltages and of undesired harmonics are filtered out during the amplifying operation, whereby the maximum operating sensitivity of the amplifiers is retained without loss, to enable the system to operate at its maximum sensitivity and efficiency.

The construction and the manner of operation of the filter are shown in the accompanying drawings, in which:

Figure 1 is a block diagram of a servo loop in which the filter of this invention is utilized;

Figure 1-a is a schematic diagram of the torque motor element of the filter;

Figure 2 is a longitudinal sectional view of a filter of this invention;

Figure 3 is a schematic and elevational end view at the take-off end of the filter;

Figure 4 is an axial sectional view of the take-off rotor;

Figure 5 is a schematic diagram of the elements of the filter; and

Figure 6 is an elevational view of the end wall plate of the filter, showing the adjustment bolts for permitting angular adjustment of the end wall plate on its supporting wall flange structure.

Figure 7 is a schematic view of one E-bridge unit in its neutral position and in each limit position; and Figure 8 is a schematic view of the entire E-bridge structure, to show the winding arrangement of the energizing winding and of the signal take-off winding.

As shown in Figure 1, a servo system 11 is shown as consisting of a servo loop containing a signal source 12, a signal adding or comparing device 13, an amplifier section 14, a filter 15 of this invention, a final amplifier section 16, a servo motor 17 and a tachometer generator 18 connected to and driven by the motor 17, which serves also to position a controlled load device 20.

The output signal from the tachometer generator 18 is fed back through a feed-back circuit, shown as a conductor 19, into the signal comparator 13 for transmission to the front amplifier section 14.

For simplicity, the signal source 12 is shown as a potentiometer having a movable terminal contact 21 that is indicated to be mechanically driven by some suitable external control device through a mechanical connection 22.

The conventional tachometer generator, represented by the symbol 18, is shown schematically in Figure 1-a. It generally consists of an input winding 24 and an output winding 25, with the input winding 24 energized from a suitable source of constant operating voltage of desired frequency, such as here represented by the supply circuit 26. The operation of the tachometer generator 18 is such that the output voltage generated in the output winding 25 is in quadrature electric relationship, or ninety degrees out of phase with the voltage across the input winding 24. As previously stated, one of the inherent defects of this type of tachometer generator is that a spurious unwanted quadrature voltage component is also generated in the output winding by the effect of leakage fluxes in the tachometer generator throughout the entire range of operation of the tachometer generator.

The total signal voltage from the tachometer generator thus includes not only the true signal, that is generated as a function of the speed of the motor-generator unit, but also contains, as a component, the undesired spurious quadrature voltage that is generated by the leakage fluxes. Such spurious voltage component is fed back to the amplifier input as part of the feed-back energy.

The filter 15 operating according to the principles of this invention, serves to filter out the spurious quadrature component so that only a function of the true operating signal from the working source 12 is amplified and transmitted through the final amplifier section 16 to the servo motor 17.

The mechanical filter 15, shown in detail in Figure 2 and schematically in Figure 5, comprises generally a torque motor 28 and an induction generator to serve as a take-off signal device 29. The torque motor 28 is shown as having two windings 31 and 32, the winding 31 being a signal input winding and the winding 32 being a phase position or reference winding for relatively fixed constant excitation. The signal take-off 29 of the filter 15 is shown also as comprising an exciting winding 33 and an output signal winding 34, both of which are disposed on the laminated core structure 35, shown in Figures 2 and 3. The input winding 33 is energized and disposed to function as part of the amplifier transmission circuit. The double output signal winding 34 serves a polarity-selective secondary transformer winding on the core 35, as shown in the schematic part of Figure 3.

The sectional view of Figure 2 shows a preferred form of the filter 15 which comprises the torque motor 28 as input, and the signal take-off 29, as output, as schematically indicated in Figure 5. The torque motor 28 and the take-off 29 have their respective movable elements mounted on a common shaft 50, and all are enclosed within a shell 51 which ultimately serves as the main part of a sealed housing 52. Before the shell 51 is hermetically sealed to enclose the entire unit of motor and take-off, the shell is filled with a suitable damping fluid to introduce viscous resistance to rotation of the movable shaft and its carried elements. Also before the shell 51 is sealed closed, electrical connections to the windings are brought into the housing through sealed terminals 52a sealed into a cover plate 53 that is hermetically sealed to cover end-wall 54 for the housing by a suitable soldered seal 55. The cover end-wall 54 is then suitably soldered to the shell 51 to establish a hermetic seal with the shell 51.

The signal or input winding 31 of the torque motor 28 is shown supported on an inner annular stator core 56, and the fixed-phase winding 32 of the motor is supported on an outer annular stator core 57. The two annular cores 56 and 57 are separated by a symmetrical cylindrical air gap 58 of suitable dimensions to accommodate a rotor cup 59. The cup 59 is mechanically anchored to the shaft 50 by suitable means, herein indicated as a locknut assembly 61 and a reaction pressure pin 62 that is fitted into the shaft 50.

The two windings 31 and 32 of the torque motor 28 are suitably arranged and disposed to be energized to enable the motor to operate as a two-phase motor, so the motor will operate only when the voltages supplied to the windings 31 and 32 are ninety degrees out of phase with each other or have components that are ninety degrees out of phase with each other.

The signal take-off unit 29 is shown as comprising a stator core 35 which supports the input winding 33 and the output winding 34 previously identified in Figure 5. The take-off device further comprises a rotor 66 whose position is controlled by the torque motor 28 to establish the inductive relationship between input winding 33 and one section of output winding 34 of the take-off device 29. The rotor 66 of the signal take-off device 29 is constructed to embody six separate arcuate armature 67, as shown more fully in Figures 3 and 8.

As shown in Figure 4, the arcuate armatures 67 are supported on a spider 68 provided with a hub 69 that is concentrically secured on the shaft 50. The web 70 of spider 68 is provided with four equally-spaced openings 71, shown more fully in Figure 3. The top opening 71 is normally concentrically disposed, as in Figure 2, around a stop pin 72 which is anchored in an annular hub portion 73 on the end wall 74 of the housing 52. The stop pin 72 thus limits the permitted angular movement of the rotor and shaft 50 about twelve degrees on either side of neutral position, corresponding to the position of the rotor with opening 71 concentrically around stop pin 72.

In order to add suitable viscous damping to provide a drag on the torque motor movement, as previously stated, the entire housing is filled with a suitable damping fluid, such as one of the fluid silicones. In the present application, a damping fluid which has been found to function satisfactorily is one having a viscosity of almost five hundred to one thousand centipoises, which is found in the silicone fluid commercially available as Dow-Corning 510.

As further shown in Figure 2, the main shaft 50 is supported between two bearings 76 and 77. The bearing 76 is concentrically mounted within the annular hub 73 on the end wall 74. The bearing 77 is concentrically mounted within a cylindrical hub section 78 on an end wall plate 79. The hub section 78 has an integral cylindrical hub extension 80 beyond the hub section 78 to serve as a cylindrical supporting bracket for the inner stator core 56 of the motor.

The end wall plate 79 is arranged to be anchored concentrically in proper position on an annular end ring 85 by three mounting bolts 82 extending through arcuate slots 83 in the end wall plate 79, as shown in Figure 6, and threading into the end ring 85. The arcuate slots 83 permit a small amount of angular adjustment of the end wall plate 79 to properly dispose the two stator cores 56 and 57 for optimum motor operation. The annular end ring 85 is press-fitted into the shell 51 against a shoulder 86 and is then anchored in such position. The angular adjustment provided for the end plate 79 on ring 85 is to permit the inner coil 31 and its core 56 to be selectively positioned at a position in electrical quadrature with the already positioned output winding 32 on anchored core 57.

The take-off rotor 66 comprises the spider 70 as a suitable supporting structure, and utilizes the six arcuate elements 67 as separate armatures for each of the take-off units that make up the entire take-off, as shown in Figures 3, 4, 7 and 8.

Each arcuate element 67 consists of a magnetizable body, which is physically separated from the adjacent arcuate body 67 by a slot or space 90. The arcuate body elements 67 are all portions of an originally concentric ring 67a, initially seated in position on a seat 91, shown in Figure 2, on the peripheral surface of the web flange 68. During manufacture, the ring 67 is anchored to the seat 91 on the web flange 68 by a simple low temperature metallic cement.

As shown in Figures 2 and 4, the original ring 67a is provided with V-shaped grooves 93 and 94 respectively, on each end face, to permit a more positive nesting and locking action between parts of the seating flange 91 and the ring 67a. The web flange seat 91 is provided with an annular ring wall 97 along one edge, and the wall has an annular re-entrant tapered axially directed boss 95 to fit into one V-shaped annular groove 93 disposed in one side edge of the ring 67a. The other edge of the web flange 91 is shaped to embody a continuous ring or individual finger portions 97 to be folded or bent over the outer lower edge 67a–1 of the ring 67a, during manufacturing assembly, to hold the ring 67a anchored in place on the web flange 68. A subsequent machining operation forms the slots or spaces 90 in ring 67a to separate the continuous ring 67a into the desired number of separate armature sections 67.

These armature sections 67 co-operate as part of the pick-off 29, which thus constitutes, in effect, a set of six E-bridges with one set of corresponding coils connected in series to make up the primary winding, and a set of coils to make up the secondary winding. The stator core 35 consists of a stack of regular laminations with twelve usual slots and teeth. The coils of the primary winding are laid so the even-numbered teeth will be alternately of opposite magnetic polarity. The coils of the secondary winding are laid so the odd-numbered teeth will be alternately of opposite magnetic polarity. The inductive relationship between the primary winding and the secondary winding is controlled by the position of the rotor ring sections 67 serving as the movable armatures of the respective E-bridges.

For simplicity, one E-bridge unit section is shown schematically in Figure 3, in association with one armature 67. A portion of the laminated core 35 is shown with three teeth 101, 102 and 103 serving as the three legs of the E-bridge. A coil 104 surrounds the middle tooth 102, and is one of six similar coils of the exciting or primary winding, of the pick off, each of these coils being on the middle tooth of each E-bridge. Two series-connected coils 105 and 107 of the output winding are shown respectively surrounding each of the end teeth 101 and 103. The two coils 105 and 107 are oppositely wound on the respective teeth 101 and 103. When the filter 15 is in neutral position, the pick off 29 is in corresponding neutral position, and each armature 67 is disposed in its neutral position between its two associated end teeth 101 and 103, by the width of a cut or gap 90 between adjacent ends of successive armatures 67, as shown in Figure 3.

The two end teeth 101 and 103 respectively span the air spaces 90, so that only one-half of each end tooth may be considered to be part of its E-bridge. Each end tooth is thus an end leg for two adjacent E-bridges.

Considering Figure 3, for one E-bridge unit, when the filter 15 as a whole is in neutral position, the armature 67 is also in neutral position, and the voltages induced into the two output coils 105 and 107 on the end legs of the E-bridge are ideally equal and opposite, and therefore cancel. The output voltage under such condition of the bridge in neutral position is therefore zero.

When the filter torque motor 28 is moved, however, in one direction or in the other, for example clockwise, in Figures 3, 7 and 8, by the amplified signal from amplifier section 14, each armature 67 is moved away from its one end tooth, for example tooth 101 and is moved into close-coupled magnetic relation with its other end tooth 103. Consequently, strong transformer inductive action is established between the exciting winding coil 104 and the close-coupled output winding coil 107 on tooth 103. On the other hand, weak inductive action occurs between the exciting winding coil 104 and the output winding coil 105 because coil 105 is loose-coupled to coil 104, due to the large air gap between the armature 67 and the tooth 101.

By disposing the output coils 105 and 107 in oppositely-wound directions relative to their respectively associated end teeth 101 and 103, the inductive action of the exciting or primary coil 104 into the secondary or output coil 105 or 107 becomes phase-selective according to the direction of movement of the pick-off 29, corresponding to the direction of movement of the filter 15 as a whole. The filter is thus polarity-responsive to the amplified signal from amplifier section 14, and, in turn, transmits its new clean output signal to the final amplifier section 16 with the same proper relative polarity.

The voltage induced from the exciting primary coil 104 into either secondary or output coil 105 or 107 is practically a direct function and reproduction, in form, of the voltage from the supply circuit 26. Such reproduced voltage is entirely free of any spurious quadrature voltage components and represents a clean signal for use in the amplifier back section 16.

In the case illustrated above, with the filter shifted clockwise in Figure 3 to its limit position, against the limit pin 72, shown in Figures 2 and 4, the right-hand end of armature 67 magnetically substantially covers the face of tooth 103, while the left-hand end of armature 67 uncovers and moves away from the face of tooth 101. As shown in more detail in Figure 7, the top arrangement shows the armature 67 in neutral position, the middle arrangement shows the armature in extreme clockwise position, and the bottom arrangement shows the armature in extreme counter clockwise position. Each of the six separate armatures 67 will occupy the same relative close-coupled position with respect to its associated E-bridge unit.

As Figure 8 shows, each coil 105 or 107 of the output winding 34 on an end pole of an E-bridge unit serves two adjacent E-bridge units.

What is claimed:

1. A servo system comprising
  A command signal voltage source;
  An amplifier system containing a plurality of stages to receive a signal voltage from said source and to amplify the signal for subsequent use;
  A servo motor to be energized from said amplifier system to operate a load device or a control element for the load device;
  A tachometer signal voltage generator driven by the motor to generate an output signal voltage for comparison with and addition to the command signal voltage, the output signal voltage from the tachometer generator being characterized by a spurious quadrature voltage component;
  Means combining the output signal voltage with the command signal voltage to establish an error signal and to feed such error signal to the amplifier system;
  And electro-mechanical means for filtering out the spurious quadrature voltage component from the error signal, and for supplying a clean signal free of quadrature components to the servo motor.

2. A servo system as in claim 1, in which
  The electro-mechanical filtering means is disposed serially in the circuit of the amplifier system, and serves to filter out the spurious quadrature voltage component from the error signal while such error signal is within the amplifier system.

3. A servo system as in claim 1, in which
  The electro-mechanical filtering means is disposed serially in the circuit of the amplifier system, and serves to filter out the spurious quadrature voltage component from the error signal before such error signal leaves the amplifier system.

4. A servo system, as in claim 1, in which
  The electro-mechanical filtering means is disposed serially in the circuit of the amplifier system, and serves to filter out the spurious quadrature voltage component from the error signal before such error signal is fed to the last stage of the amplifier system.

5. A servo system as in claim 2, in which
  The electro-mechanical filtering means comprises a torque motor movable in either direction through a predetermined limited angle from neutral or null position in response to the amplifier error signal, and comprises also a signal-generator operable by the torque motor to generate a signal proportional to the angle and direction of swing of the torque motor from its null position, for amplification by at least a part of said amplifier system.

6. A servo system comprising:

A signal source;

Amplifying means comprising signal-filtering means to conduct and amplify the signal from said source;

A servo motor to drive a load and to be driven in accordance with the directional amplitude of said amplified signal;

A signal generator for generating a signal voltage that is a function of the servo motor speed, said signal voltage being characterized by the content of an undesirable spurious quadrature voltage component;

And means for eliminating said quadrature voltage component from the amplified signal during its passage through the amplifying means.

7. A servo system comprising a signal source; amplifying means comprising signal-filtering means adapted to conduct and amplify the signal from said source; a servo-motor to drive a load and to be driven in accordance with the directional amplitude of said amplified signal; a signal generator for generating a signal voltage that is a function of the servo-motor speed, said signal voltage being characterized by the inclusion of an undesirable spurious quadrature voltage component; and means for eliminating said quadrature voltage component from the amplified signal during its passage through the amplifying means, the means for eliminating the quadrature voltage component comprising a dynamo-electric induction device.

8. An electro-mechanical filter for removing unwanted components from an electrical signal, the filter comprising A torque motor to be driven in accordance with the electrical signal and having a neutral or null position, and being movable in either direction therefrom in accordance with said signal;

A signal generator to be moved by the motor in either direction and also having a zero or null position, and operative to generate a signal upon such movement in either direction according to the direction and extent of movement from its null position;

And means coupling the motor and the generator with each in its null position.

9. An electro-mechanical filter as in claim 8, including Means for impressing a viscous restraining force on the motor.

10. An electro-mechanical filter as in claim 8, in which The motor and the generator are hermetically sealed in a closed vessel filled with a fluid having suitable consistency to impose a viscous force restraint on the motor generator unit.

11. An electro-mechanical filter for removing spurious quadrature components from a generated control signal, comprising:

A torque motor movable bi-directionally through a limited angle in response to said signal;

Means providing viscous damping to restrain the angular motor movement;

And a vane take-off having a null position and movable by the torque motor to generate a take-off signal corresponding to the deviation of the take-off from its null position.

12. An electro-mechanical filter for removing spurious quadrature components from a generated control signal, comprising:

A torque motor to be energized and operated by an applied externally amplified error signal and bi-directionally movable through a limited angle;

Means for viscously damping the motor movement;

Means for limiting the angle of movement of the motor in either direction from a pre-determined null position;

And a signal take-off means operable by the motor to generate a signal whose amplitude varies as a function of the angle of motor deviation from its null position.

13. An electro-mechanical filter, as in claim 12, in which the

Signal take-off consists of a null-balanced magnetic bridge.

14. An electro-mechanical filter, as in claim 12, in which the

Signal take-off consists of a null-balanced magnetic E-bridge.

15. An electro-mechanical filter, as in claim 12, in which the

Signal take-off consists of a plurality of null-balanced magnetic E-bridges.

16. A servo loop comprising:

A signal source;

Amplifying means comprising signal-filtering means to conduct and amplify the signal from said source;

A servo motor to drive a load and to be driven in accordance with the directional amplitude of said amplified signal;

A signal generator for generating a signal voltage that is a function of the servo motor speed, said signal voltage being characterized by the content of an undesirable spurious quadrature voltage component;

And means serially in the loop including a signal integrator for eliminating said quadrature voltage components from the amplified signal during its passage through the amplifying means.

17. A servo loop, as in claim 16, in which

The eliminating means comprises a dynamo-electric induction torque device and a magnetic bridge subject to regulation by the torque device to develop an output signal.

18. A servo loop, as in claim 17, in which

The magnetic bridge is an E-bridge having an armature movable to establish null balance or unbalance of the E-bridge, and the armature is controlled by the induction torque device in accordance with the input signal to the amplifying means.

19. An electro-mechanical filter comprising

An electro-magnetic torque motor having a stator, and a rotor operable thereby around an axis;

Means viscously damping the rotation of the motor rotor;

And a signal generator operable by the motor, said generator comprising one or more E-bridge stator cores, each core having three arms with two output circuits thereon, and the three arms having front edge faces disposed in a cylindrical plane around said axis, each stator core having a co-operating armature, and each armature being of arcuate shape and having a front arcuate surface movable in a path in a cylindrical plane concentric with, and slightly spaced from, the faces of the E-bridge structure, to vary the reluctance of the two circuits of the associated E-bridge.

References Cited in the file of this patent

UNITED STATES PATENTS

| | | |
|---|---|---|
| 2,115,086 | Riggs | Apr. 26, 1938 |
| 2,139,558 | Moseley et al. | Dec. 6, 1938 |
| 2,832,020 | Towner | Apr. 22, 1958 |